United States Patent [19]

Takemura et al.

[11] Patent Number: 5,135,821
[45] Date of Patent: Aug. 4, 1992

[54] COIN TYPE CELL WITH LEAD TERMINALS

[75] Inventors: Tatsuya Takemura, Kyoto; Osamu Watanabe, Toyonaka; Kaoru Hisatomi, Takatsuki, all of Japan

[73] Assignee: Hitachi Maxell, Ltd., Osaka, Japan

[21] Appl. No.: 598,407

[22] Filed: Oct. 18, 1990

[30] Foreign Application Priority Data

Oct. 19, 1989 [JP] Japan .................. 1-273163

[51] Int. Cl.⁵ .............................. H01M 2/22
[52] U.S. Cl. .......................... 429/65; 429/121
[58] Field of Search .............. 429/657, 121; 439/79-82

[56] References Cited

U.S. PATENT DOCUMENTS

| | | | |
|---|---|---|---|
| 3,013,187 | 12/1961 | Wyma et al | 439/78 X |
| 4,037,898 | 7/1977 | Guyette | 439/79 X |
| 4,623,206 | 11/1986 | Fuller | 439/81 |
| 4,778,396 | 10/1988 | Spooren | 439/82 |
| 4,802,860 | 2/1989 | Kikuta | 439/79 |

OTHER PUBLICATIONS

Patent Abstract of Japan, vol. 11, No. 288 (E-542) (2735), Sep. 17, 1987; & JP-A-62-88258 (Matsushita Electric Ind.) Apr. 22, 1987.
Patent Abstract of Japan, vol. 11, No. 288 (E-542)(2735), Sep. 17, 1987; & JP-A-62-88259 (Matsushita Electric Ind.) Apr. 22, 1987.
Patent Abstract of Japan, vol. 12, No. 486 (E-695)(3333) Dec. 18, 1988; & JP-A-68-202846 (Fuji Electrochem. Co.) Aug. 22, 1988.

*Primary Examiner*—Stephen Kalafut
*Attorney, Agent, or Firm*—Birch, Stewart, Kolasch & Birch

[57] ABSTRACT

Short circuit between a lead terminal for a negative electrode and a positive electrode can of a coin type cell can be prevented by providing a protuberance for preventing short circuit on a part of the lead terminal for the negative electrode which part is to be positioned over an area where the lead terminal for the negative electrode and the positive electrode can are present adjacent to each other.

2 Claims, 3 Drawing Sheets

COIN TYPE CELL WITH LEAD TERMINALS

BACKGROUND OF THE INVENTION

1. Field of the Invention

The present invention relates to a coin type cell with lead terminals.

2. Description of the Related Art

With the development of a coin type cell having good storage properties such as a coin lithium cell, this coin cell is used as a back-up electric source for an electrical device or appliance. To such a coin type cell, lead terminals are attached beforehand so as to make it easy to assemble the cell in a circuit base of the electrical device or appliance. In a conventional technique, as shown in FIG. 1, one end of a lead terminal 5 for a positive electrode is bonded to a positive electrode can 2, and one end of a lead terminal 6 for a negative electrode is spot welded to an upper surface of a central part of a negative electrode plate 3. The other end of each of the lead terminals 5 and 6 extends in a radial direction of a coin type cell 1 beyond an edge at which the negative electrode plate 3 and the positive electrode can 2 meet each other.

In an actual coin type cell, an opening edge 2a of the positive electrode can 2 reaches nearer to the upper surface of the negative electrode plate 3 than the distance seen in FIG. 1 which is an enlarged figure. Therefore, when a load is applied on an upper side of the lead terminal 6 for the negative electrode, the lead terminal 6 is bent and contacts the a periphery of the positive electrode can 2 to form a short circuit.

To prevent the formation of a short circuit through contact of the lead terminal 6 to the positive electrode can, 2 the periphery of the electrode can 2 is covered with an insulating tube 7, a front part of which is cut away (see, for example, Japanese Utility Model Kokai Publication No. 19145/1985).

However, the covering of the periphery of the positive electrode can 2 increases the production cost of the cell and decreases productivity.

SUMMARY OF THE INVENTION

An object of the present invention is to provide a coin type cell with lead terminals which has no insulating covering on the periphery of the positive electrode can and in which a lead terminal for a negative electrode does not contact the positive electrode can when the lead terminal is bent by a load applied on its upper side.

According to the present invention, there is provided a coin type cell with lead terminals which comprises a positive electrode can, a negative electrode plate which is engaged with the positive electrode can, a first lead terminal attached to the positive electrode can, and a second lead terminal attached to the negative electrode plate, wherein second lead terminal is in a plate form one end of which is welded to an upper surface of a center part of the negative electrode plate, a protuberance for preventing short circuiting being is provided on a part of the second lead terminal which part is to be positioned over an area where the second lead terminal and the positive electrode can are present adjacent to each other, a top face of the protuberance facing the negative electrode plate, and an edge of said protuberance on the cell center the is present inside a peripheral edge of an upper surface of the negative electrode plate.

DETAILED DESCRIPTION OF THE INVENTION

The flat electrode with the lead terminals according to the present invention will be explained by making reference to FIGS. 3 to 7.

When a load is applied to the upper side of the lead terminal 6 at its outer end in the radial direction of the cell, a protuberance 6a for prevents short circuit contact to the upper surface of the negative electrode plate 3, whereby further bending of the lead terminal 6 is prevented. That is, with the protuberance 6a for preventing short circuiting, the stiffness of the lead terminal 6 is increased, and thereby bending of the lead terminal 6 is prevented when load is applied to the upper surface of the lead terminal 6 so that the lead terminal 6 does not contact the periphery of the positive electrode can 2 and formation of short circuit is prevented.

Figure 3:
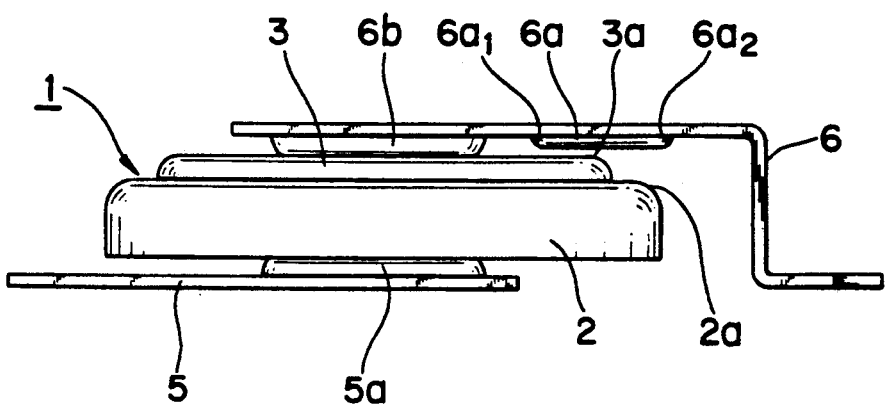
FIGS. 3 and 4 are a front view and a perspective view respectively of a coin type cell with lead terminals according to the present invention, respectively.
Figure 4:
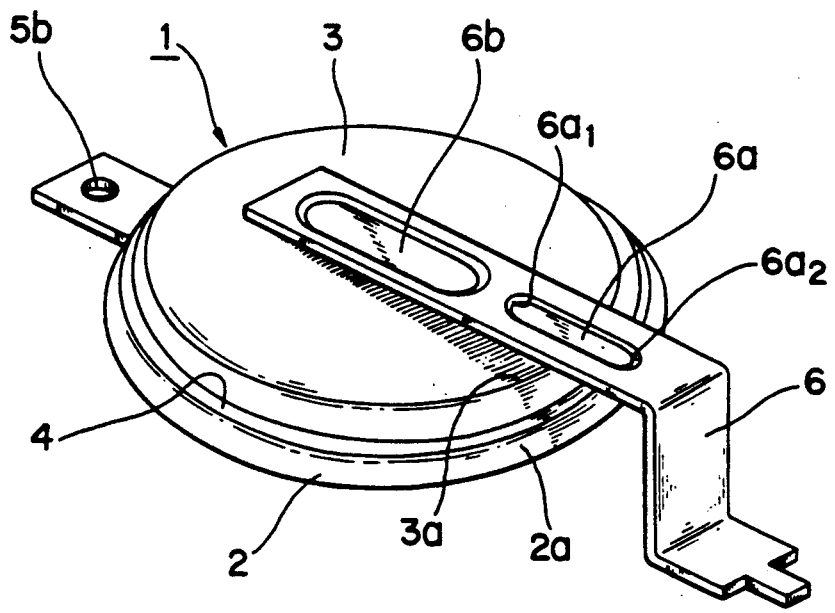

As shown is FIGS. 3 and 4, the coin type cell 1 of the present invention comprises a positive electrode can 2, a negative electrode plate 3 and an insulating packing 4 which is inserted between the negative electrode plate 3 and the positive electrode can 2. The coin type cell 1 further comprises a lead terminal 5 for the positive electrode plate and a lead terminal 6 for the negative electrode.

The lead terminal 5 for the positive electrode has a protuberance 5a at one end and is spot welded to a bottom of the positive electrode can through the protuberance 5a. The other end of the positive electrode 5 extends in the radial direction of the cell beyond the periphery of the cell and has a hole 5b.

The lead terminal 6 for the negative electrode has a protuberance 6a for preventing short circuiting and a protuberance 6b for welding at one end. The protuberance 6b faces the negative electrode plate 3 and is spot welded to the upper surface of the center part of the negative electrode plate 3.

The protuberance 6a for preventing short circuiting is positioned over an area where the lead terminal 6 and the positive electrode can 2 are present adjacent to each other. The top of the protuberances 6a faces the negative electrode plate 3, and an edge $6a_1$ on the cell center side is present inside a peripheral edge 3a of the upper surface of the negative electrode plate 3.

Figure 5:
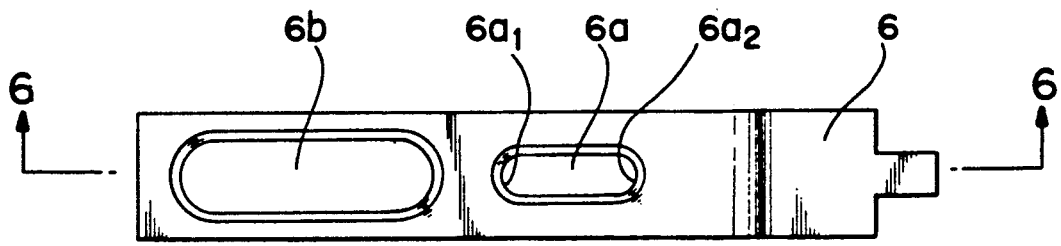
FIG. 5 is a plane view of a lead terminal for a negative electrode used in the coin type cell of FIGS. 3 and 4.
Figure 6:
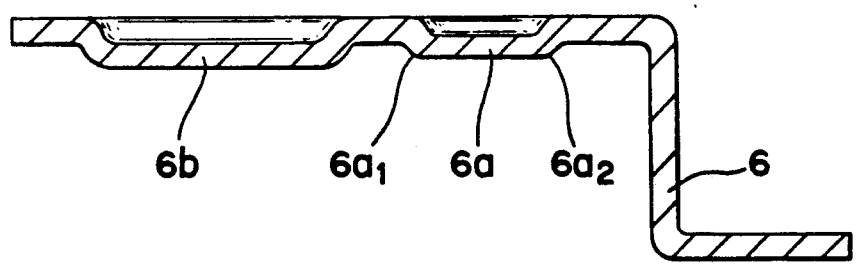
FIG. 6 is a cross sectional view of the lead terminal of FIG. 5 along the line A—A.

The other end of the lead terminal 6 extends in the radial direction of the cell 1 beyond the area where the lead terminal 6 and the positive electrode can are present adjacent to each other. Outside the cell region, the lead terminal 6 is bent downwardly and then horizontally on the same plane as the lead terminal 5 for the positive electrode, as shown in FIGS. 5 and 6.

Typically, the cell 1 has a diameter of about 16 mm and a thickness of about 1.6 mm. The diameter and the thickness may be smaller or larger than the above sizes.

In general, the negative electrode is made of a lithium-aluminum alloy, and the positive electrode is made of a positive electrode composition comprising manganese dioxide as a positive electrode active material.

Usually, the positive electrode can is made of stainless steel, and the negative electrode plate is also made of stainless steel.

The insulating packing is made of a synthetic resin or rubber, such as polypropylene.

The lead terminal 5 for the positive electrode is made of stainless steel.

The lead terminal 6 for the negative electrode is also made of stainless steel and has a width of about 4 mm and a thickness of about 0.2 mm. The width and thickness may be smaller or larger than these sizes. The protuberance 6b for welding has a height of about 0.2 mm. This height may be lower or higher than 0.2 mm according to the design of the cell.

The protuberance 6a for preventing short circuiting has a height of about 0.1 mm, a length of about 3.2 mm, and a width of about 1.4 mm. These sizes may also be changed according to the design of the cell.

An edge $6a_2$ of the protuberance 6a is present outside the opening edge 2a of the positive electrode can 2.

In the above embodiment of FIGS. 5 and 6, the protuberances 6a and 6b are formed by pressing the negative electrode plate 2, although they may be formed by welding a mass of a metal onto the negative electrode plate 2.

EXPERIMENT

Figure 1:
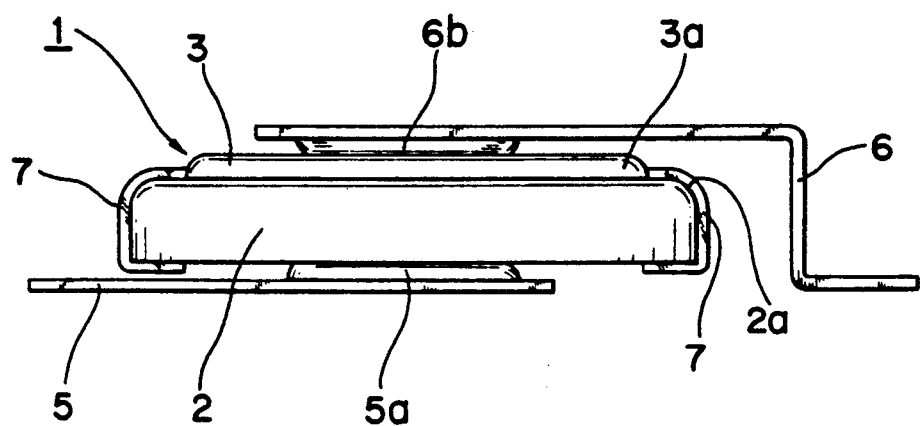
FIG. 1 is a front view of a conventional coin type cell with lead terminals.
Figure 2:
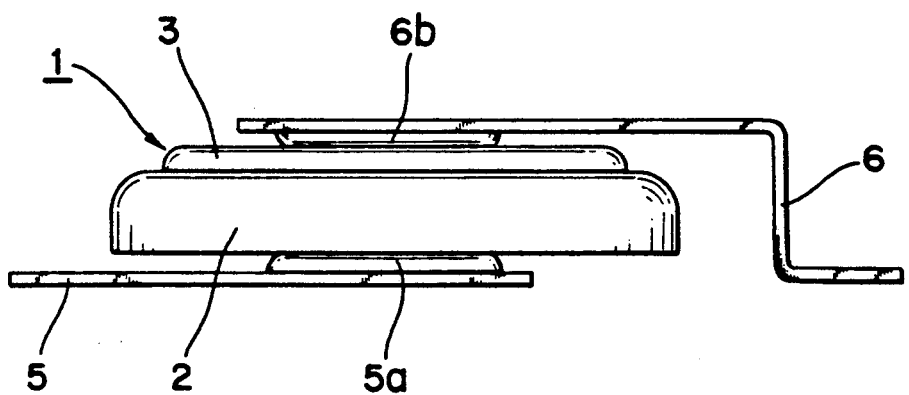
FIG. 2 is a front view of a comparative coin type cell with lead terminals.
Figure 7:
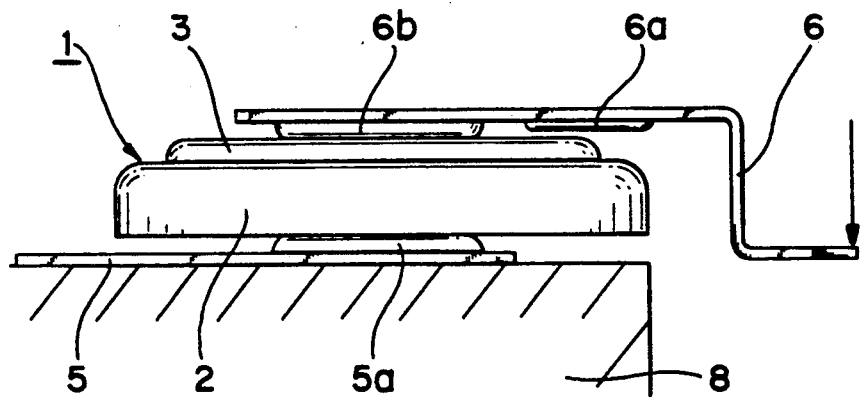
FIG. 7 is a front view of the coin type cell according to the present invention which is placed on a stand for testing short circuiting between the lead terminal for the negative electrode and the positive electrode can.

A coin type cell with the lead terminal of the present invention (Cell A), shown in FIGS. 1 and 2, was placed on a stand 8 as shown in FIG. 7, and a load of 10 kg was applied to the outer end of the lead terminal 6 for the negative electrode in a downward direction indicated by an arrow in FIG. 7. Then, whether or not a short circuit was caused is determined.

For comparison, a coin type cell having the same structure as that of FIG. 1, except that no protuberance 6a was formed (Cell B), is subjected to the same test as above. The result are shown in the following Table.

With each type of cell, ten samples were tested, and the table shows the number of the cells in which short circuiting occured.

TABLE

| Cell | Number of cells in which the short circuit was formed |
| --- | --- |
| A | 0 |
| B | 8 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A coin cell with lead terminals which comprises a positive electrode can, a negative electrode plate which is engaged with said positive electrode can, a first lead terminal attached to said positive electrode can, and a second lead terminal attached to said negative electrode plate, wherein said second lead terminal is in plate form, a first end of which is welded to an upper surface of a center part of said negative electrode plate, and a second end of which extends in a radial direction with respect to said coil cell beyond an area where said second lead terminal and said positive electrode can are juxtapositioned to each other, said second lead terminal being provided on an underside thereof with a protuberance for preventing said second lead terminal from contacting said positive electrode can where said second lead terminal and said positive electrode can are juxtapositioned, thereby preventing short circuiting between said negative electrode plate and said positive electrode can, said protuberance having a top face which faces said negative electrode plate, and a medial edge on a cell center side thereof present inside a peripheral edge of said upper surface of said negative electrode plate.

2. The coin cell according to claim 1, wherein said second lead terminal for said negative electrode plate is bent downwardly and then horizontally beyond said cell periphery to be on a plane with that of said first lead terminal.

* * * * *